United States Patent [19]

Schweikert et al.

[11] Patent Number: 5,222,842
[45] Date of Patent: Jun. 29, 1993

[54] MILLING TOOL

[75] Inventors: Karl Schweikert, Bühl, Fed. Rep. of Germany; Helmut Weisser, New Bern, N.C.

[73] Assignee: Robert Bosch GmbH, Stuttgart, Fed. Rep. of Germany

[21] Appl. No.: 761,934

[22] PCT Filed: Dec. 23, 1989

[86] PCT No.: PCT/DE89/00790
§ 371 Date: Sep. 16, 1991
§ 102(e) Date: Sep. 16, 1991

[87] PCT Pub. No.: WO90/13386
PCT Pub. Date: Nov. 15, 1990

[30] Foreign Application Priority Data

Apr. 28, 1989 [DE] Fed. Rep. of Germany ....... 3914074

[51] Int. Cl.⁵ .............................................. B23C 5/18
[52] U.S. Cl. ...................................... 407/53; 76/115; 144/219; 408/225
[58] Field of Search ......... 76/115; 408/239 R, 239 A, 408/223, 224, 225, 226, 227, 228; 144/218, 219, 240, 241; 279/102, 103; 407/30, 120, 53, 54

[56] References Cited

U.S. PATENT DOCUMENTS

| | | | |
|---|---|---|---|
| 877,592 | 1/1908 | Parry et al. | 408/223 X |
| 1,628,352 | 5/1927 | Bonazzi | 76/115 X |
| 1,769,433 | 7/1930 | Janson | 144/240 |
| 2,320,612 | 6/1943 | Kandle | 144/219 X |
| 4,257,462 | 3/1981 | Oller | 144/218 |
| 4,541,757 | 9/1985 | Reynolds et al. | 407/53 |
| 4,677,886 | 7/1987 | Neu | 144/218 X |

FOREIGN PATENT DOCUMENTS 3623559 1/1987 Fed. Rep. of Germany .

*Primary Examiner*—Steven C. Bishop
*Attorney, Agent, or Firm*—Michael J. Striker

[57] ABSTRACT

The milling tool, in one form, has a shank having a shank rotation axis, a first cutting-edge carrier having at least one cutting edge and at least two arched areas and a second cutting-edge carrier having at least one cutting edge and at least two arched areas. The arched areas are shaped and positioned to form a tubular socket in which the shank is attached with both cutting-edge carriers radially projecting in a lobe-like manner from the shank and being rotatable about the shank rotation axis. The at least two arched areas of both cutting-edge carriers are spaced from each other axially, have surfaces normal to the shank rotation axis, arch in the same direction and are displaced from and parallel to the shank rotation axis so that the first and second cutting-edge carriers mutually overlap to form the tubular socket for the shank so that, when the shank is attached in the tubular socket, the cutting-edge carriers are locked against each other.

28 Claims, 5 Drawing Sheets

MILLING TOOL

BACKGROUND OF THE INVENTION

The invention relates to a milling tool.

A milling tool is known having a shank to which a substantially flat first cutting-edge carrier having at least one cutting edge is fastened in a radially projecting, lobe-like manner. The cutting-edge carrier is intended to rotate about a crrier rotation axis located in its plane.

German Patent Specification 2,523,201 has already disclosed a two-piece spade drill. This spade drill consists of a cylindrical shank which is slit at the end face so that it roughly has the shape of a fork with two prongs. A flat, plane, carbide drill tip provided with two cutting edges is fastened in the slit. On account of this solution, it is possible to combine higher-grade cutting-edge material with inexpensive, lower-grade carrier material.

Like drills, end mills are also mainly suitable for absorbing axial forces. In this respect, drills and milling cutters are comparable with one another. For this reason, the abovementioned publication is also cited as prior art for the present invention.

A disadvantage of the known solution is the low strength, due to the shape, of the shank in the area of the forking. This disadvantage can be compensated for only to a limited extent even by the best joining techniques between the cutting-edge carrier and the shank. The consequences are unfavourable vibration behaviour, high wear caused by this at the cutting edges of the tool, rapid fatigue and fracture of the shank as well as inferior cutting or working quality.

SUMMARY OF THE INVENTION

It is an object of the present invention to provide an improved milling tool in which the above-mentioned disadvantages are at least partially cured or alleviated.

This object, and others which will be made more apparent hereinafter, are attained in a milling tool having a shank having a shank rotation axis and a flat first cutting-edge carrier having at least one cutting edge. The cutting-edge carrier is fastened to the shank in a radially projecting, lobe-like manner. The cutting-edge carrier is intended to rotate about a carrier rotation axis in its plane.

According to one form of the invention, the milling tool consists of a shank having a shank rotation axis and a substantially flat cutting-edge carrier having at least one cutting edge and at least two arched areas. The at least two arched areas are shaped and positioned to form a tubular socket in which the shank is held so that the cutting-edge carrier is attached to the shank in a radially projecting lobe-like manner and is rotatable about the shank rotation axis. The shank rotation axis is arranged in a plane of the substantially flat cutting-edge carrier.

In a preferred embodiment of this form of the invention two arched areas are arched in opposite directions from each other and are displaced from and parallel to the shank rotation axis to at least partially form the tubular socket.

According to another form of the invention, the milling tool consists of a shank having a shank rotation axis, a first cutting-edge carrier having at least one cutting edge and at least two arched areas and a second cutting-edge carrier having at least one cutting edge and at least two arched areas. The arched areas are shaped and positioned to form a tubular socket in which the shank is attached with both cutting-edge carriers radially projecting in a lob-like manner from the shank rotatable about the shank rotation axis.

In an advantageous modification of this other form of the invention, the at least two arched areas of the first cutting-edge carrier are spaced from each other axially, have surfaces normal to the shank rotation axis and arch in the same direction displaced from and parallel to the shank rotation axis and the at least two arched areas of the second cutting-edge carrier are spaced from each other axially, have surfaces normal to the shank rotation axis, arch in the same direction displaced from and parallel to the shank rotation axis so that the first and second cutting-edge carriers mutually overlap to form the tubular socket for the shank so that, when the shank is attached in the tubular socket, the cutting-edge carriers are locked against each other.

The shank is attached to the cutting-edge carriers or carrier by any of a number of methods including a crimp joint, a weld joint, a brazed joint or an adhesively bonded joint.

A milling tool has the advantages that it is particularly simple and inexpensive to manufacture and combines long life with a very high level of achievable working quality as well as particular user-friendliness.

Finished standardized pins can be used as the shank, and already existing semi-finished metal plates or plate parts which are simple to produce can be used as the cutting-edge carrier. The shape of the shank and thus also its strength are not affected by the cutting-edge carrier fastened thereto. The shank therefore keeps its highest possible strength based on the shape.

Mounting or assembling the individual parts, already hardened if need by, to form a finished tool can be carried out in a simple manner. The low mass of the milling tool permits particularly high rotational speeds. The shape of the cutting-edge carriers makes possible user-friendly handling with reduced risk of injury in particular when clamping the milling tool. Out-of-balance after the sharpening is virtually negligible on account of the shape or the mass distribution of the cutting-edge carrier.

BRIEF DESCRIPTION OF THE DRAWING

The invention is explained through exemplary embodiments and is shown in an associated drawing, in which.

DESCRIPTION OF THE PREFERRED EMBODIMENT

Figure 1:
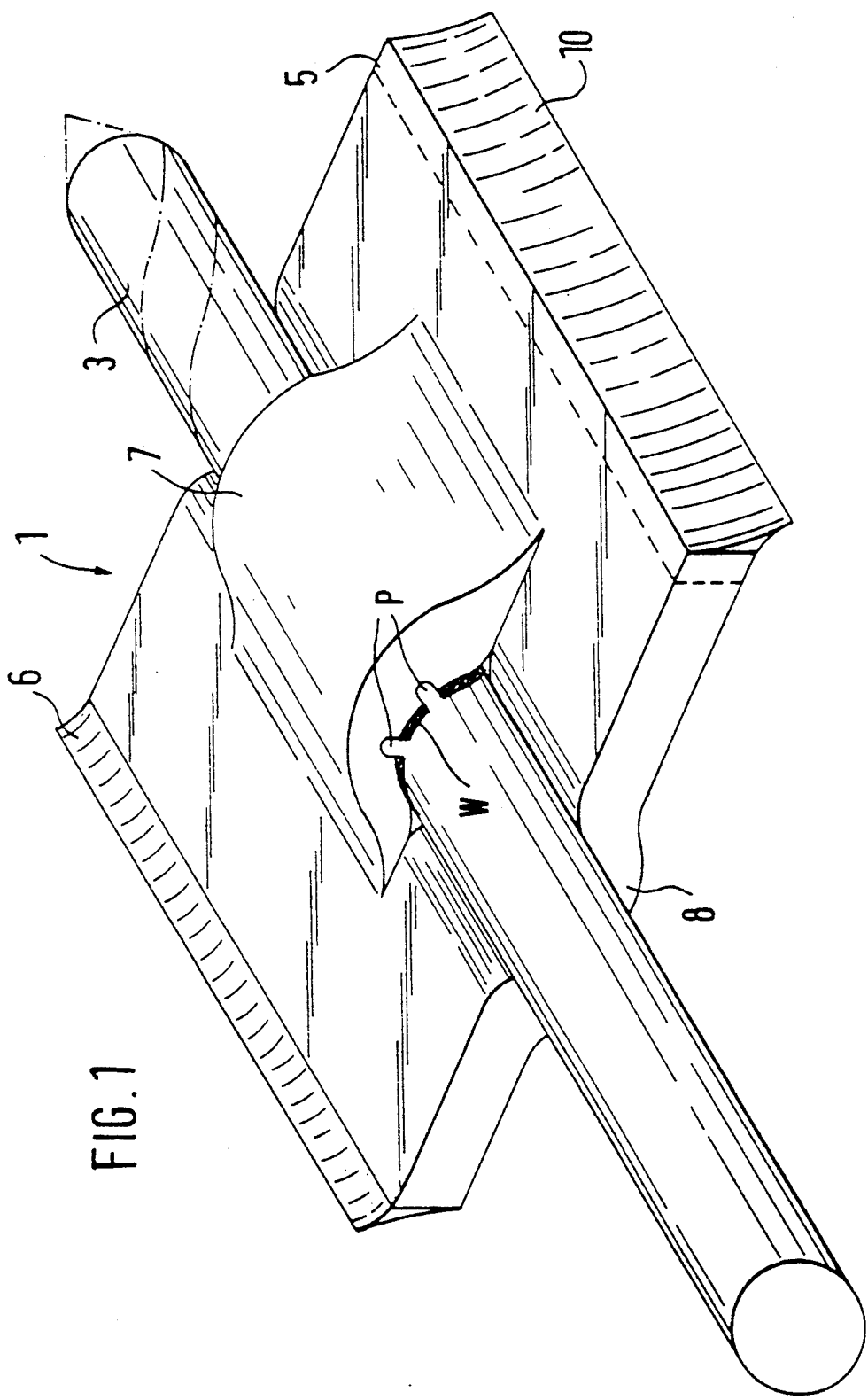
FIG. 1 is a prospective view of a milling tool having only one cutting-edge carrier.

FIG. 1 shows a milling tool 1 which consists of a cylindrical shank 3 and a flat cutting-edge carrier 5. The cutting-edge carrier 5 is provided with an arched area 7 which emerges from the plane of the cutting-edge carrier 5 in the form of a tube segment and in which the shank 3 is guided and held. In this exemplary embodiment, the remaining area of the cutting-edge carrier 5 on which the shank 3 rests has a concavely arched area 8 which is directed in the opposite direction to the first area 7 and serves to improve the seating of the shank 3 and to distribute the force more uniformly between the shank 3 and the cutting-edge carrier 5.

Figure 2:
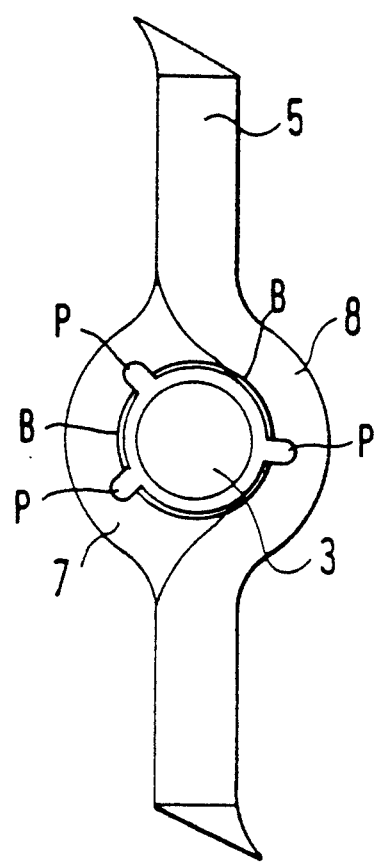
FIG. 2 shows a side view of it.

At its edges furthest away from the axis of the shank 3, the cutting-edge carrier 5 is provided with cutting edges 6, 10. Possible further additional front cutting edges (not shown in the drawing) can be arranged on the end face of the cutting edge carrier 5. The shank 3 can be designed on one side as a drill (indicated with dot-dashed lines in FIG. 1), which then functions as a center bit for the milling tool 1. A crimped joint can be produced between the shank 3 and the cutting-edge carrier 5 via the arched areas 7, 8. However, the crimped joint can also be made solely at the shank 3 on each side of the arched areas 7, 8 in such a way that a positive-locking connection is produced between the shank 3 and the cutting-edge carrier 5. Radial projections P are provided on the shank 3 in the vicinity of the crimp joint. Other joining means can be adhesive bonding, brazing or welding, in particular laser welding. In FIG. 1 a weld joint W is shown connecting the shank 3 to the arched areas 7,8 of the cutting-edge carrier 5. In FIG. 2 a brazed joint B is shown symbolically which connects the shank 3 to the cutting-edge carrier B.

The arched areas 7, 8 which radially embrace the shank 3 are shown particularly clearly in FIG. 2.

Figure 3:
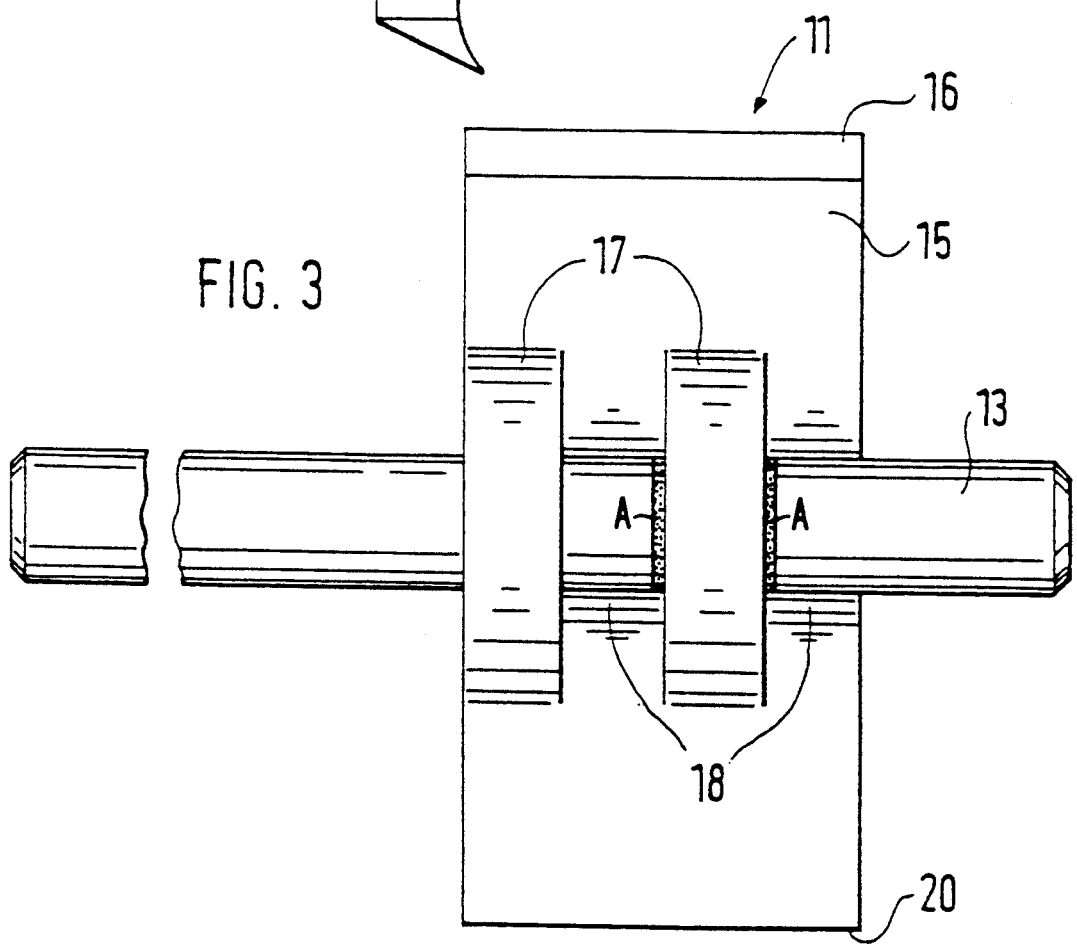
FIG. 3 is a plan view of a milling tool having only one cutting-edge carrier with areas arched several times.

FIG. 3 shows a milling tool 11 whose shank 13 is held on the cutting-edge carrier 15 by additional arched areas 17, 18. At its outer edges, the cutting-edge carrier 15 is provided with cutting edges 16, 20.

Figure 4:
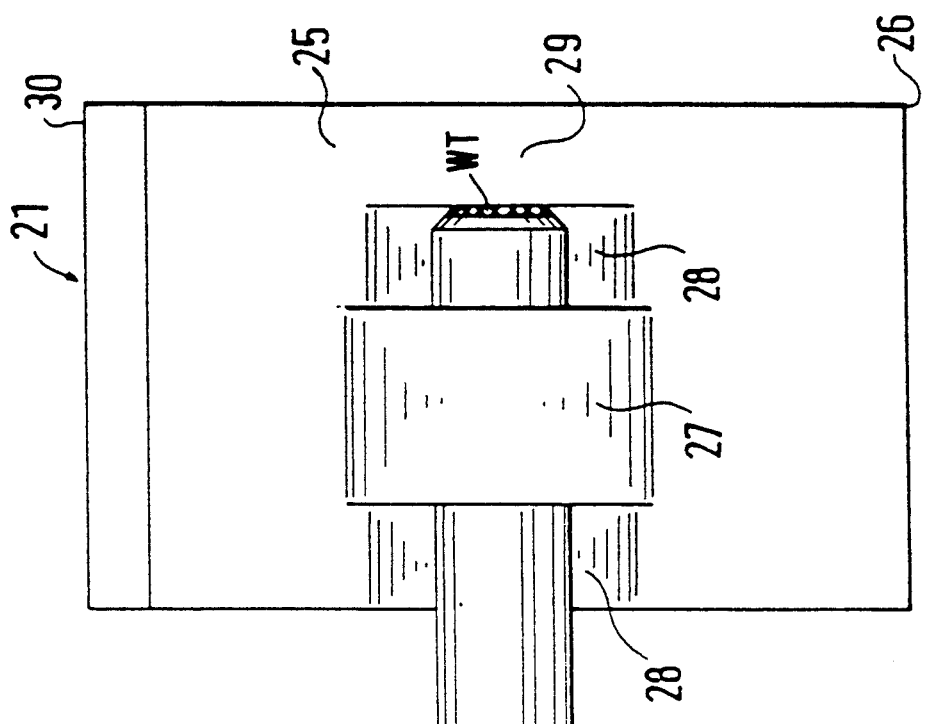
FIGS. 4 and 5 are respectively plan and side views of a milling tool having a shank terminating inside only one cutting-edge carrier.

A milling tool 21 having a shank 23 and a cutting-edge carrier 25 is shown in FIG. 4. The milling tool 21 is provided with arched areas 27, 28. One of the arched areas 27, 28 is constructed in such a way that a piece of the cutting-edge carrier 25, as a flat cross member 29 which has not been shaped, runs in extension of the axis of the shank 23. This cross member 29 serves as an axial stop for the shank 23 and can serve as an additional joining surface for the shank 23. Cutting edges 26, 30 are arranged on the outer edges of the cutting-edge carrier 25. There can be a welded joint WT between the web 29 and the shank 23. An adhesive joint A can also be used to connect the shank 13 to the cutting-edge carrier 15.

Figure 5:
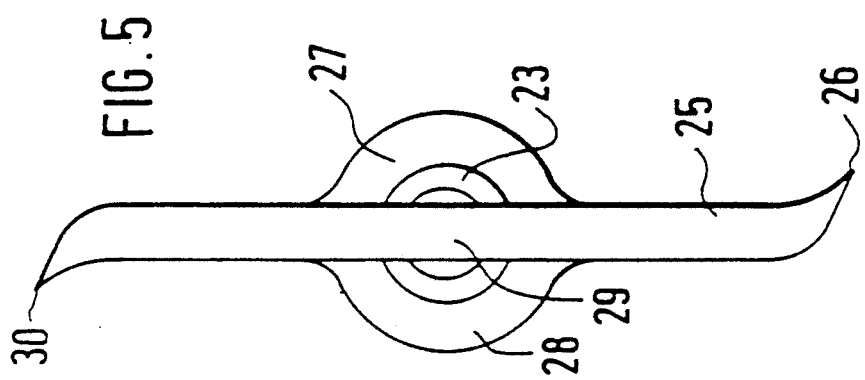

FIG. 5 shows the side view of the exemplary embodiment in FIG. 4. Here, the profile of the web 29 can be recognized particularly clearly.

Figure 6:
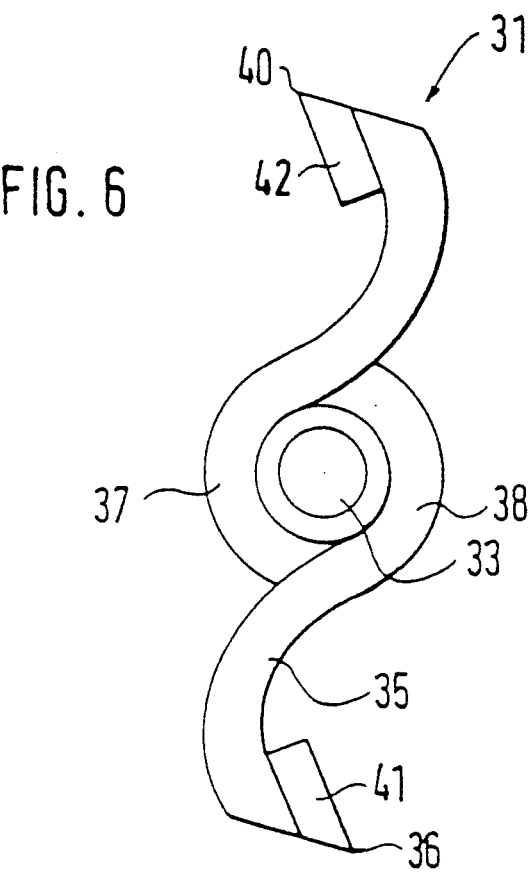
FIG. 6 shows a milling tool having only one cutting-edge carrier which carries separate cutting tips.

An exemplary embodiment of a milling tool 31 in metal plate construction is shown in a side view in FIG. 6. A shank 33 is guided on a cutting-edge carrier 35 between arched areas 37, 38. Cutting edges, 36, 40 are arranged on cutting tips 41, 42. The latter are fastened to the cutting-edge carrier 35 on the side moving towards the workpiece during operation of the tool by brazing, adhesive bonding or welding.

All exemplary embodiments according to FIGS. 1–6 can be made of sintered metal, plate or steel. Differences arise here in the possible joints, depending on the material, between the shank 3, 13, 23, 33 and the cutting-edge carrier 5, 15, 25, 35. Whereas crimped joints can be conveniently and favorable produced for the steel construction, adhesively bonded, brazed or welded joints are more favorable for the sintered-metal construction.

Figure 7:
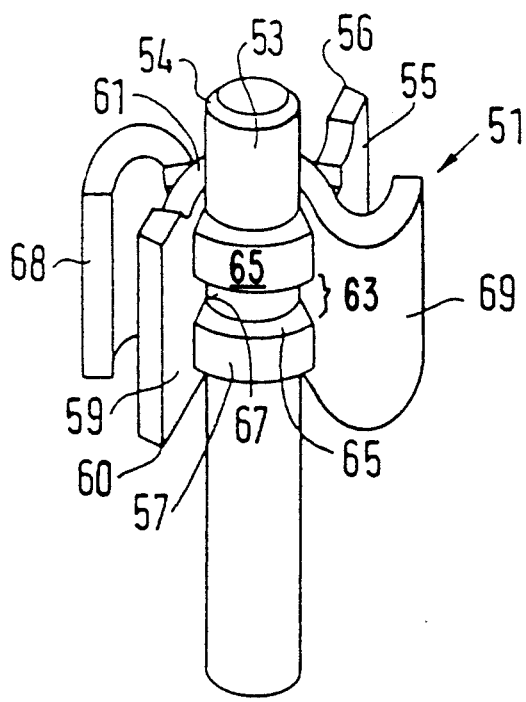
FIG. 7 is a perspective view of a milling tool having two cutting-edge carriers and curved safety lobes.

A milling tool 51 shown in FIG. 7 consists of a cylindrical shank 53 which has a bevel 54 and carries a first and second cutting-edge carrier 55, 59 having a first and second cutting edge 56, 60. The cutting-edge carrier 55 is provided with an arched area 57 having recesses 63—shown in FIG. 8—and webs 65 remaining between these recesses 63. The second cutting-edge carrier 59 is likewise provided with an arched area 61—shown in FIG. 8—having recesses 63 and crosspieces 65. The crosspieces 65 of the first cutting-edge carrier 55 pass through the recesses 63 of the second cutting-edge carrier 59 and, conversely, the crosspieces 65 of the second cutting-edge carrier 59 pass through the recesses 63 of the first cutting-edge carrier 55. The crosspieces 65 curved in opposite directions and overlapping one another form a tubular socket 67 for accommodating the shank 53.

The cutting edges 56, 60—relative to the axis of the shank 53—are arranged on radially outer end edges of the cutting-edge carriers 55, 59. The ends of the cutting-edge carriers 55, 59 opposite the cutting edges 56, 60 are bent over to form safety lobes 68, 69. The latter are at a clearly smaller distance from the axis of shank 53 than the cutting edges 56, 60. The safety lobes 68, 69 function on the one hand as a grip suitable for the hand for inserting the milling cutter 51 into a tool holder and on the other hand as a counterweight for the side of the cutting edges 56, 60. The vibration behaviour of the milling tool 51 during its normally very high-speed rotation when milling is thereby improved. Any out-of-balance caused by the wear of the cutting edges 56, 60 is minimized.

Additional front cutting edges (not shown in the drawing) can be arranged, for example, on the end faces of the cutting-tool carriers 55, 59.

Figure 8:
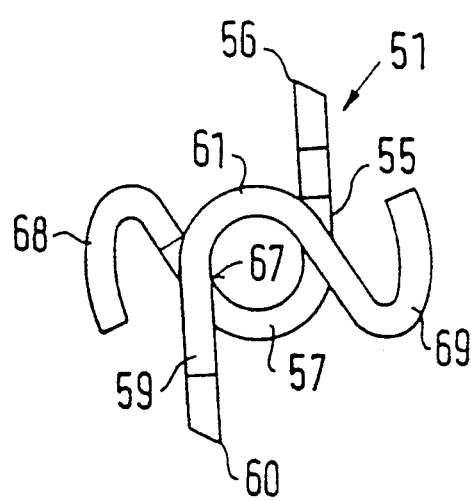
FIG. 8 shows its cross-section.

The cross-section of the milling tool 51 shown in FIG. 8 shows its S-shaped profile. The safety lobes 68, 69 are bent over at an acute angle and merge tangentially into the arched areas 57, 61. These merge tangentially on the side facing away from the safety lobes 68, 69 into the straight cutting-edge carriers 55, 59.

Figure 9:
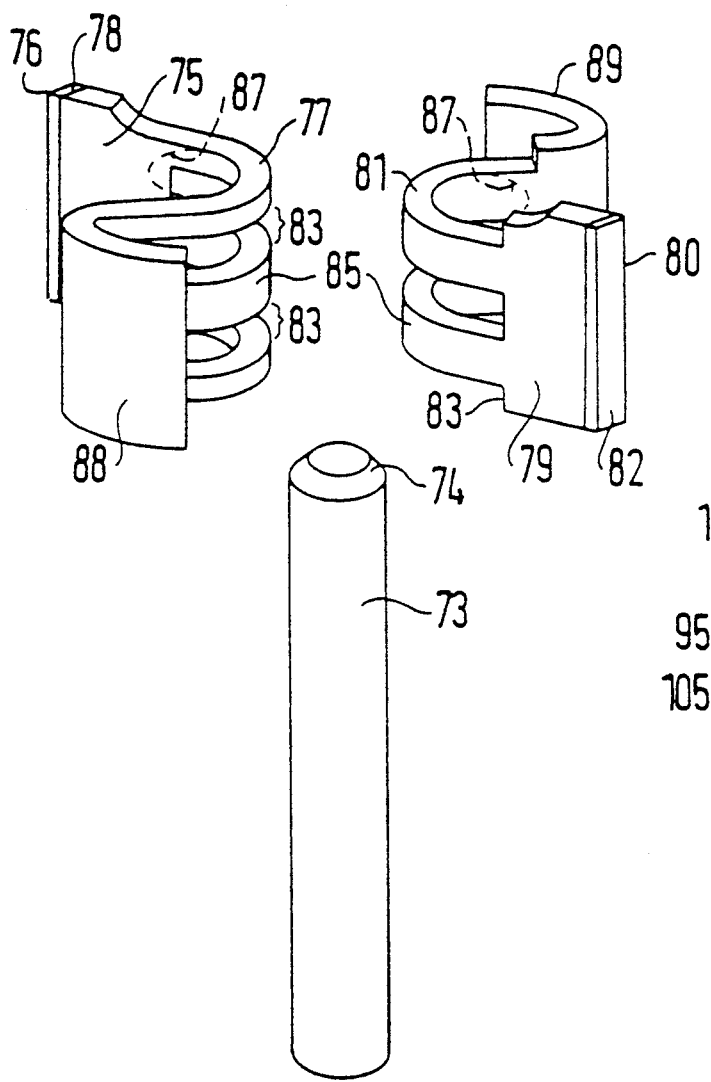
FIG. 9 shows the exploded representation of a milling tool having cutting-edge carriers with cutting tips.

The cutting-tool carriers 75, 79 shown in a further exemplary embodiment in FIG. 9 and having the cutting edges 76, 80 are arranged opposite one another in such a way that—by moving towards one another—their crosspieces 85 move into the recesses 83. The crosspieces 85 overlapping one another in this way together form the socket 87 (shown by broken line) into which the shank 73 is inserted. The bevel 74 at one end of the shank 73 facilitates its insertion into the socket 87.

It is convenient to secure the cutting-edge carriers 75, 79 in terms of rotation relative to one another and relative to the shank 73 by crimped, clamped, welded, brazed or adhesively bonded joint. By the use of a slightly conical shank 73 narrowing in the push-in direction, a particularly good, self-locking interference fit of the shank 73 in the tubular socket 87 formed by the arched areas 77, 81 can be achieved. The safety lobes 88, 89 are configured as in the previous exemplary embodiment.

A particular advantage of the exemplary embodiment according to FIG. 9 is that cutting tips 78, 82 made of higher-grade materials can be welded, adhesively bonded or brazed to the cutting-edge carriers 75, 79 made of lower-grade material.

Figure 10:
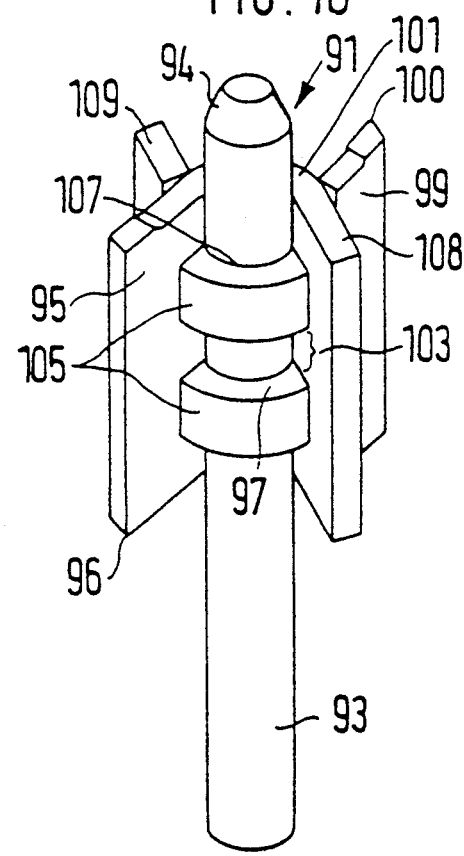
FIG. 10 shows a milling tool having straight safety lobes.

The exemplary embodiment in FIG. 10 shows a milling tool 91 which is provided with straight safety lobes 108, 109. The other parts, such as shank 93 having bevel 94, first cutting-edge carrier 95 having cutting edge 96 and arched area 97, second cutting-edge carrier 99 having second cutting edge 100 and arched area 101 and having recesses 103 as well as webs 105 form the tool 91 via a tubular socket 107 in the same way as shown in FIGS. 7 to 9.

If a crimped joint is to be produced between the shank 3, 23, 33, 53, 73, 93 and the cutting-edge carriers 5, 9, 25, 29, 55, 59, 75, 79, 95, 99, this should be made in such a way that the shank is given small radial projections in the area of the recesses 13, 33, 63, 83, 103. These radial projections help to secure the joint in terms of rotation.

An embodiment of the cutting-edge carriers 5, 9, 25, 29, 55, 59, 75, 95, 99 made of sintered metal can be economical especially for high quality requirements.

It is of advantage for certain cases if the free end of the shank facing the workpiece is designed as a drill. This drill then serves as a center bit for an axially cutting exemplary embodiment (not shown in the drawing) of a milling tool.

While the invention has been illustrated and described as embodied in a milling tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A milling tool consisting of a shank having a shank rotation axis and a substantially flat cutting-edge carrier having at least one cutting edge and at least two arched areas, said at least two arched areas being shaped and positioned to form a tubular socket in which said shank is held so that said cutting-edge carrier is attached to said shank in a radially projecting lobe-like manner and is rotatable about said shank rotation axis, said shank rotation axis being arranged in a plane of the substantially flat cutting-edge carrier.

2. A milling tool as defined in claim 1, wherein two of said arched areas are arched in opposite directions from each other and are displaced parallel to the shank rotation axis to at least partially form the tubular socket.

3. A milling tool as defined in claim 1, wherein said cutting-edge carrier has four of said arched areas arranged in two pairs spaced axially from each other, each of said pairs consisting of two of said arched areas arched in opposite directions from each other and are displaced parallel to the shank rotation axis to form the tubular socket.

4. A milling tool as defined in claim 1, wherein the arched areas are bounded by surfaces normal to the shank rotation axis.

5. A milling tool as defined in claim 1, wherein the shank is structured like a drill.

6. A milling tool as defined in claim 1, wherein the shank is a cylindrical pin and is held in the tubular socket formed by the arched areas via a crimp joint.

7. A milling tool as defined in claim 1, wherein the shank is attached to the cutting-edge carrier by welding.

8. A milling tool as defined in claim 1, wherein the shank is attached to the cutting-edge carrier by a crimp joint and the shank is provided with a plurality of radial projections in the vicinity of the crimp joint.

9. A milling tool as defined in claim 1, wherein the shank is attached to the cutting-edge carrier via a brazed joint.

10. A milling tool as defined in claim 1, wherein the cutting-edge carrier is made of metal plate.

11. A milling tool consisting of a shank having a shank rotation axis, a first cutting-edge carrier having at least one cutting edge and at least two arched areas and a second cutting-edge carrier having at least one cutting edge and at least two arched areas, said arched areas being shaped and positioned to form a tubular socket in which said shank is attached with both of said cutting-edge carriers radially projecting in a lobe-like manner from said shank and being rotatable about said shank rotation axis.

12. A milling tool as defined in claim 11, wherein the shank is attached to at least one of the cutting-edge carriers by a crimp joint.

13. A milling tool as defined in claim 12, wherein the shank is provided with a plurality of radial projections in the vicinity of the crimp joint.

14. A milling tool as defined in claim 11, wherein the shank is attached to at least one of the cutting-edge carriers by welding.

15. A milling tool as defined in claim 11, wherein the shank is attached to at least one of the cutting-edge carriers by a brazed joint.

16. A milling tool as defined in claim 11, wherein the shank is attached to at least one of the cutting-edge carriers by adhesive means.

17. A milling tool as defined in claim 11, wherein the first and second cutting-edge carriers are made of metal plate.

18. A milling tool as defined in claim 11, wherein the first and second cutting-edge carriers are made of sintered metal.

19. A milling tool as defined in claim 11, wherein the first and second cutting-edge carriers have separate cutting tips.

20. A milling tool as defined in claim 11, wherein the shank is structured like a drill.

21. A milling tool consisting of a shank having a shank rotation axis, a first cutting-edge carrier having at least one cutting edge and at least two arched areas and a second cutting-edge carrier having at least one cutting edge and at least two arched areas, said arched areas being shaped and positioned to form a tubular socket in which said shank is attached with both of said cutting-edge carriers radially projecting in a lobe-like manner from said shank and being rotatable about said shank rotation axis, wherein said at least two arched areas of said first cutting-edge carrier are spaced from each other axially, have surfaces normal to the shank rotation axis, arch in the same direction and are displaced from and parallel to the shank rotation axis, and said at least two arched areas of said second cutting-edge carrier are spaced from each other axially, have surfaces normal to the shank rotation axis, are displaced from and parallel to the shank rotation axis and arch in the same direction, so that the first and second cutting-edge carriers mutually overlap to form the tubular socket for the shank so that, when said shank is attached in the tubular socket, the cutting-edge carriers are locked against each other.

22. A milling tool as defined in claim 21, wherein the cutting-edge carriers are provided with a plurality of crosspieces and recesses and engage in one another like a zip fastener and pass through one another alternately, and said crosspieces form the tubular socket for the shank.

23. A milling tool as defined in claim 22, wherein the crosspieces are designed to fit the recesses.

24. A milling tool as defined in claim 23, wherein the shank is a cylindrical pin and is held in the tubular socket via a crimp joint.

25. A milling tool as defined in claim 23, wherein the shank is a self-locking cone and is held in the tubular socket in an interference fit.

26. A milling tool as defined in claim 25, wherein the cutting-edge carriers each have a safety lobe without cutting edges located opposite the cutting edges.

27. A milling tool as defined in claim 26, wherein the safety lobes have ends and are rounded off at said ends.

28. A milling tool as defined in claim 27, wherein the safety lobes are bent over.

* * * * *